United States Patent
Pandit et al.

(10) Patent No.: US 11,155,205 B2
(45) Date of Patent: Oct. 26, 2021

(54) COMMUNICATIONS FOR AUTONOMOUS VEHICLES

(71) Applicant: WAYMO LLC, Mountain View, CA (US)

(72) Inventors: Salil Pandit, Mountain View, CA (US); Julien Mercay, Redwood City, CA (US); Clement Wright, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 16/874,928

(22) Filed: May 15, 2020

(65) Prior Publication Data

US 2020/0290509 A1 Sep. 17, 2020

Related U.S. Application Data

(62) Division of application No. 16/351,124, filed on Mar. 12, 2019, now Pat. No. 10,696,222.

(51) Int. Cl.
*B60Q 5/00* (2006.01)
*G05D 1/00* (2006.01)
*G08G 1/00* (2006.01)
*B60Q 1/26* (2006.01)

(52) U.S. Cl.
CPC ............... *B60Q 5/005* (2013.01); *B60Q 1/26* (2013.01); *G05D 1/0088* (2013.01); *G08G 1/202* (2013.01)

(58) Field of Classification Search
CPC .................................................. B60W 5/005
See application file for complete search history.

(56) References Cited

U.S. PATENT DOCUMENTS

| | | |
|---|---|---|
| 9,494,938 B1 | 11/2016 | Kemler |
| 9,836,057 B2 | 12/2017 | Fairfield et al. |
| 9,953,283 B2 | 4/2018 | Sweeney et al. |
| 9,970,615 B1 | 5/2018 | Cardillo et al. |
| 10,139,237 B2 | 11/2018 | Outwater et al. |
| 2002/0171542 A1 | 11/2002 | Bloomfield et al. |
| 2017/0178269 A1* | 6/2017 | McKinnon ............ G06Q 50/30 |

(Continued)

FOREIGN PATENT DOCUMENTS

JP 2003151081 A 5/2003

OTHER PUBLICATIONS

International Search Report and Written Opinion for Application No. PCT/US2020/021679 dated Jul. 1, 2020.

(Continued)

*Primary Examiner* — Travis R Hunnings
(74) *Attorney, Agent, or Firm* — Botos Churchill IP Law

(57) ABSTRACT

Aspects of the disclosure provide a method of facilitating communications from an autonomous vehicle to a user. For instance, a method may include, while attempting to pick up the user and prior to the user entering an vehicle, inputting a current location of the vehicle and map information into a model in order to identify a type of communication action for communicating a location of the vehicle to the user; enabling a first communication based on the type of the communication action; determining whether the user has responded to the first communication from received sensor data; and enabling a second communication based on the determination of whether the user has responded to the communication.

20 Claims, 11 Drawing Sheets

(56) References Cited

U.S. PATENT DOCUMENTS

| | | | |
|---|---|---|---|
| 2017/0277191 A1 | 9/2017 | Fairfield et al. | |
| 2017/0344010 A1* | 11/2017 | Rander | G01C 21/3438 |
| 2018/0089563 A1 | 3/2018 | Redding et al. | |
| 2018/0126950 A1 | 5/2018 | Alderman et al. | |
| 2018/0188731 A1 | 7/2018 | Matthiesen et al. | |
| 2018/0262834 A1* | 9/2018 | Cho | G06F 3/167 |

OTHER PUBLICATIONS

First Examination Report No. 1 for Australian Patent Application No. 2020237426, dated Sep. 7, 2021.

* cited by examiner

COMMUNICATIONS FOR AUTONOMOUS VEHICLES

CROSS REFERENCE TO RELATED APPLICATIONS

This application is a divisional of U.S. application Ser. No. 16/351,124, filed Mar. 12, 2019, the entire disclosure of which is incorporated by reference herein.

BACKGROUND

Autonomous vehicles, such as vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location.

When a person (or user) wants to be physically transported between two locations via a vehicle, they may use any number of taxi services. To date, these services typically involve a human driver who is given dispatch instructions to a location to pick up and drop off the user. Generally, these locations are worked out via physical signals (i.e. flagging down the driver), a phone call where the user explains where he or she actually is, or an in-person discussion between the driver and user. These services, while useful, generally fail to provide users with exacting information about where a pickup or drop off will occur.

BRIEF SUMMARY

Aspects of the disclosure provide a method of facilitating communications from an autonomous vehicle to a user. The method includes while attempting to pick up the user and prior to the user entering the autonomous vehicle, inputting, by one or more processors of the vehicle, a current location of the vehicle and map information into a model; identifying, using the model, a type of communication action for communicating a location of the vehicle to the user; enabling, by the one or more processors, a first communication based on the type of the communication action; and after enabling the first communication, determining, by the one or more processors, whether the user is moving towards the vehicle from received sensor data.

In one example, the type of communication action is automatically generating an audible communication by the vehicle, and enabling the first communication includes instructing the vehicle to make the audible communication. In this example, the first communication is honking a horn of the vehicle. In another example, the type of communication action is automatically surfacing an option on a client computing device of the user to enable the user to cause the vehicle to generate an audible communication. In another example, the type of communication action is automatically generating a visual communication by the vehicle, and enabling the first communication includes the vehicle making the visual communication. In this example, the first communication is flashing a headlight of the vehicle. In another example, the type of communication action is automatically surfacing an option on a client computing device of the user to enable the user to cause the vehicle to generate a visual communication. In another example, the received sensor data includes location information generated by a client computing device of the user. In another example, the received sensor data includes data generated by a perception system of the vehicle, the perception system including at least one sensor. In another example, the method also includes using a model of escalated communication to determine a type of communication action for a second communication, and enabling, by the one or more processors, a second communication based on the determination of whether the user is moving towards the vehicle, and wherein the type of communication action for the second communication is further used to enable the second communication. In this example, the type of communication action for the second communication is automatically surfacing an option on a client computing device of the user to enable the user to cause the vehicle to generate an audible communication. Alternatively, the type of communication action for the second communication is automatically surfacing an option on a client computing device of the user to enable the user to cause the vehicle to generate a visual communication. In another example, the first communication includes the vehicle automatically flashing its lights, and the second communication includes the vehicle automatically honking the vehicle's horn. In another example, the first communication includes the vehicle automatically honking the vehicle's horn, and the second communication includes the vehicle automatically requesting a customer service representative to connect with a client computing device of the user. In another example, the model is a machine learning model.

Another aspect of the disclosure provides a method of training a model for facilitating communications from an autonomous vehicle to a user. The method includes receiving, by one or more computing devices, training data including a first training input that indicates a location of a vehicle, a second training input that indicates map information, a third training input that indicates a location of the user, a fourth training input that characterizes sensor data identifying one or more objects in the vehicle's environment, and a target output indicating a type of communication; training the model, by the one or more computing devices, on the training data according to current values of parameters of the model to generate a set of output values indicative of a level of appropriateness for a type of communication; determining a difference value using the target output and the set of output values; and adjusting the current values of parameters of the model using the difference value.

In one example, the training data corresponds to a request by the user to cause the vehicle to perform the type of communication in order to communicate with the user. In another example, the type of communication is an audible communication. In another example, the type of communication is a visual communication. In another example, the training data further includes ambient lighting conditions.

DETAILED DESCRIPTION

Overview

Figure 1:
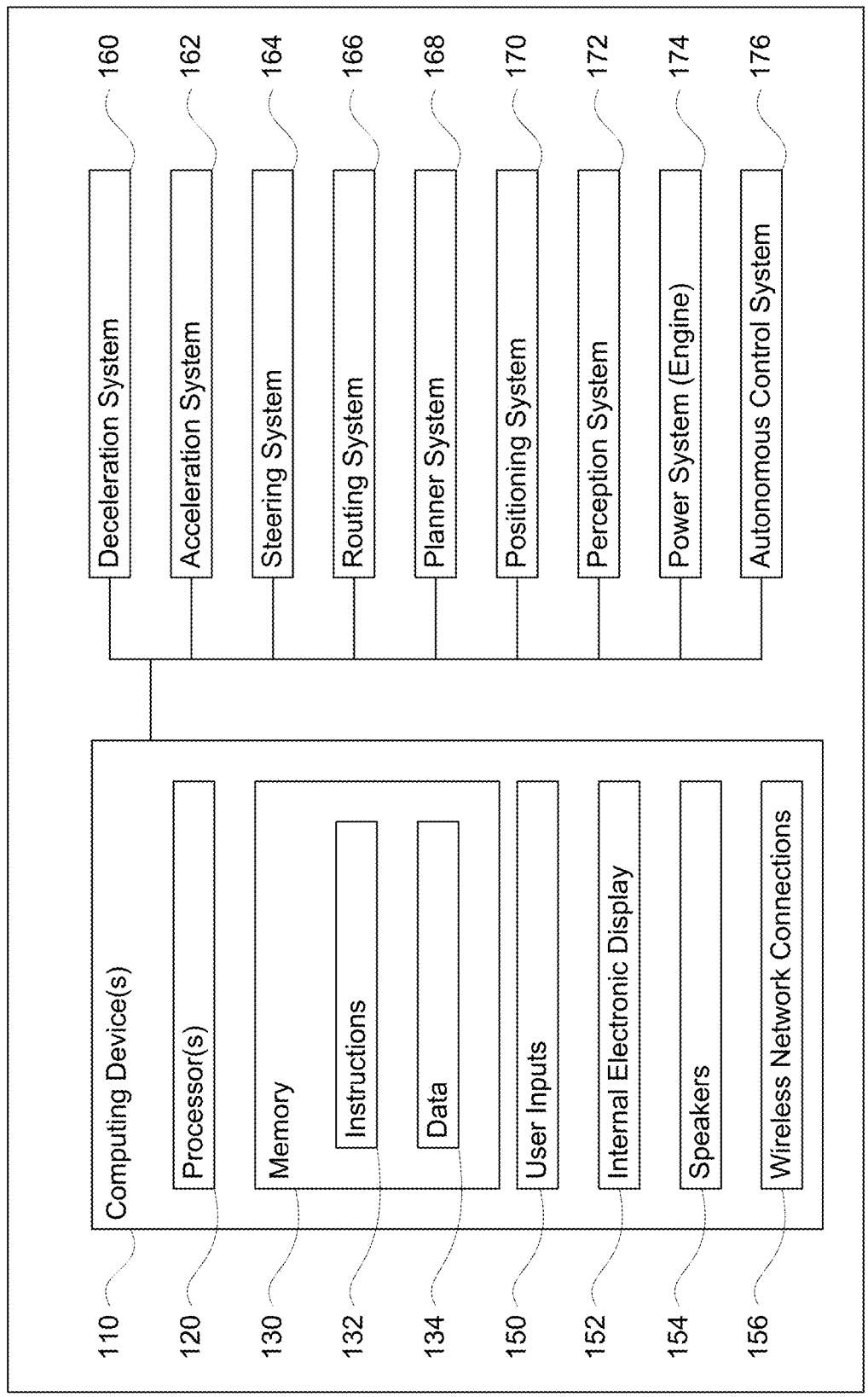
FIG. 1 is a functional diagram of an example vehicle in accordance with an exemplary embodiment.

The technology relates to facilitating pickups and drop offs of passengers (or users) or cargo for autonomous vehicles using audible and/or visual communications, or really, any situation in which a pedestrian needs to reach the vehicle. In many situations, autonomous vehicles would not have a human driver who can communicate with persons to help those persons find the vehicle (i.e., for pickup) or the right drop off location. As such, an autonomous vehicle may use various audible and/or visual communications to proactively attempt to communicate with a person in a useful and effective way. For instance, a model may be generated in order to allow the vehicle to determine when it should provide an audible and/or visual communication to a person and/or whether to surface an option for the person to do so.

In order to generate the model, persons may be provided with an option, for instance via an application on the person's computing device (e.g., mobile phone or other client computing device), to cause the vehicle to provide an audible communication. When the person uses the option, this data may be recorded. Each time the option is used, a message may be provided to the vehicle to cause the vehicle to make the communication. This message may include information such as the date and time the request was generated, the type of the communication to be made as well as a location of the person. This message as well as other information may also be sent, for instance, by the vehicle and/or the client computing device to a server computing system.

The messages and other information may then be processed by the server computing devices in order to generate a model in order to allow computing devices of vehicles to better communicate with people. For instance, the model may be trained to indicate whether a certain type of communication is appropriate. If so, the type of communication may be made available as an option in an application on a person's client computing device and/or generated automatically by a computing device of a vehicle.

In order to train the model, the location of the person, the other information as well as map information may be used as training inputs and the type of communication (from the messages) may be used as training outputs. The more training data used to train the model, the more precise the model will be at determining when to provide a communication or an option to provide a communication. The model may be trained to differentiate between situations in which a visual communication is appropriate versus when an audible communication is appropriate.

In some instances, depending upon the amount of training data available, the model may be trained for specific purposes. For instance, a model may be trained for a particular person or group of persons based on characteristics of a person's or group's history with the service.

The trained model may then be provided to one or more vehicles in order to allow the computing devices of those vehicles to better communicate with people. As a vehicle is approaching or waiting at a pickup or drop off location, the computing devices 110 of the vehicle may use the model to determine whether a communication is appropriate and if so, what type. This may occur, for instance, based on the vehicle's environment, depending on whether a person (or possible passenger) has a clear line of sight to the vehicle or vice versa.

In one aspect, the model may be used to determine whether an option as discussed above should be surfaced in the application. In addition, if the output of the model indicates that a visual communication is more appropriate than an audible communication, the surfaced option may only allow for visual communication. Similarly, if the output of the model indicates that an audible communication is more appropriate than a visual communication, the surfaced option may only allow for visual communication. In another aspect, rather than providing an option to a user for audible or visual communication, the model may be used to determine whether the vehicle should automatically make an audible or visual communication. In addition or alternatively, the output of the model may be used to determine an initial action, and subsequent actions may be taken automatically depending upon the initial action.

A user's responses to subsequent actions may be used to build a model of escalated communications. For instance, for each situation in which subsequent actions were used, the results may be tracked. This information may then be analyzed in order to identify patterns which increase the likelihood that the user will enter the vehicle more quickly in response to a vehicle communication. The model of escalated communications may be trained to determine based on a prior or initial action, what the next action should be to best facilitate the user reaching the vehicle. Again, the more training data used to train the model, the more precise the model will be at determining how to escalate from a prior action. As with the first model, the trained model of escalated communications may then be provided to one or more vehicles in order to allow the computing devices of those vehicles to better communicate with people, including potential passengers.

The features described herein may allow an autonomous vehicle to improve pickups and drop offs of passengers. For instance, users may on their own or by prompting use a surfaced option to cause a vehicle to communicate either visually and/or audibly with the user. This can more readily identify the location of the vehicle to user. In addition or alternatively, a vehicle may use the model to proactively determine whether and how to communicate with a user, as well as how to escalate those communications over time.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 134 and data 132 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 132 may be retrieved, stored or modified by processor 120 in accordance with the instructions 134. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs or GPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing devices 110 may include all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an electronic display 152 as well as one or more speakers 154 to provide information or audio visual experiences. In this regard, electronic display 152 may be located within a cabin of vehicle 100 and may be used by computing devices 110 to provide information to passengers within the vehicle 100. In some instances, the electronic display 152 may be an internal display visible through a window or other transparent vehicle housing of the vehicle to persons outside of the vehicle and/or may be able to project an image through a window or other transparent vehicle housing to provide information to people outside of the vehicle. Alternatively, the electronic display 152 may be an external mounted display that can project information to passengers inside vehicle (i.e., the underside of a roof pod that can display through a glass roof) and/or an external mounted display that provides information to people outside of vehicle.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

In one example, computing device 110 may be part of a communications system of an autonomous driving computing system incorporated into vehicle 100. In this regard, the communications system may include or may be configured to send signals to cause audible communications to be played through the speakers 154. The communications system may also be configured to send signals to cause visual communications to be made, for instance by flashing or otherwise control the vehicle's headlights 350, 352 (shown in FIG. 3) or by displaying information on the internal electronic display 152.

The autonomous control system 176 may include various computing devices, configured similarly to computing devices 110, capable of communicating with various components of the vehicle in order to control the vehicle in an autonomous driving mode. For example, returning to FIG. 1, the autonomous control system 176 may be in communication with various systems of vehicle 100, such as deceleration system 160, acceleration system 162, steering system 164, routing system 166, planner system 168, positioning system 170, and perception system 172 in order to control the movement, speed, etc. of vehicle 100 in accordance with the instructions 134 of memory 130 in the autonomous driving mode.

As an example, a computing device of the autonomous control system 176 may interact with deceleration system 160 and acceleration system 162 in order to control the speed of the vehicle. Similarly, steering system 164 may be used by autonomous control system 176 in order to control the direction of vehicle 100. For example, if vehicle 100 is configured for use on a road, such as a car or truck, the steering system may include components to control the angle of wheels to turn the vehicle. The autonomous control system 176 may also use the signaling system in order to signal the vehicle's intent to other drivers or vehicles, for example, by lighting turn signals or brake lights when needed.

Routing system 166 may be used by the autonomous control system 176 in order to generate a route to a destination. Planner system 168 may be used by computing device 110 in order to follow the route. In this regard, the planner system 168 and/or routing system 166 may store detailed map information, e.g., highly detailed maps identifying the shape and elevation of roadways, lane lines, intersections, crosswalks, speed limits, traffic signals, buildings, signs, real time traffic information, pull over spots vegetation, or other such objects and information.

Figure 2:
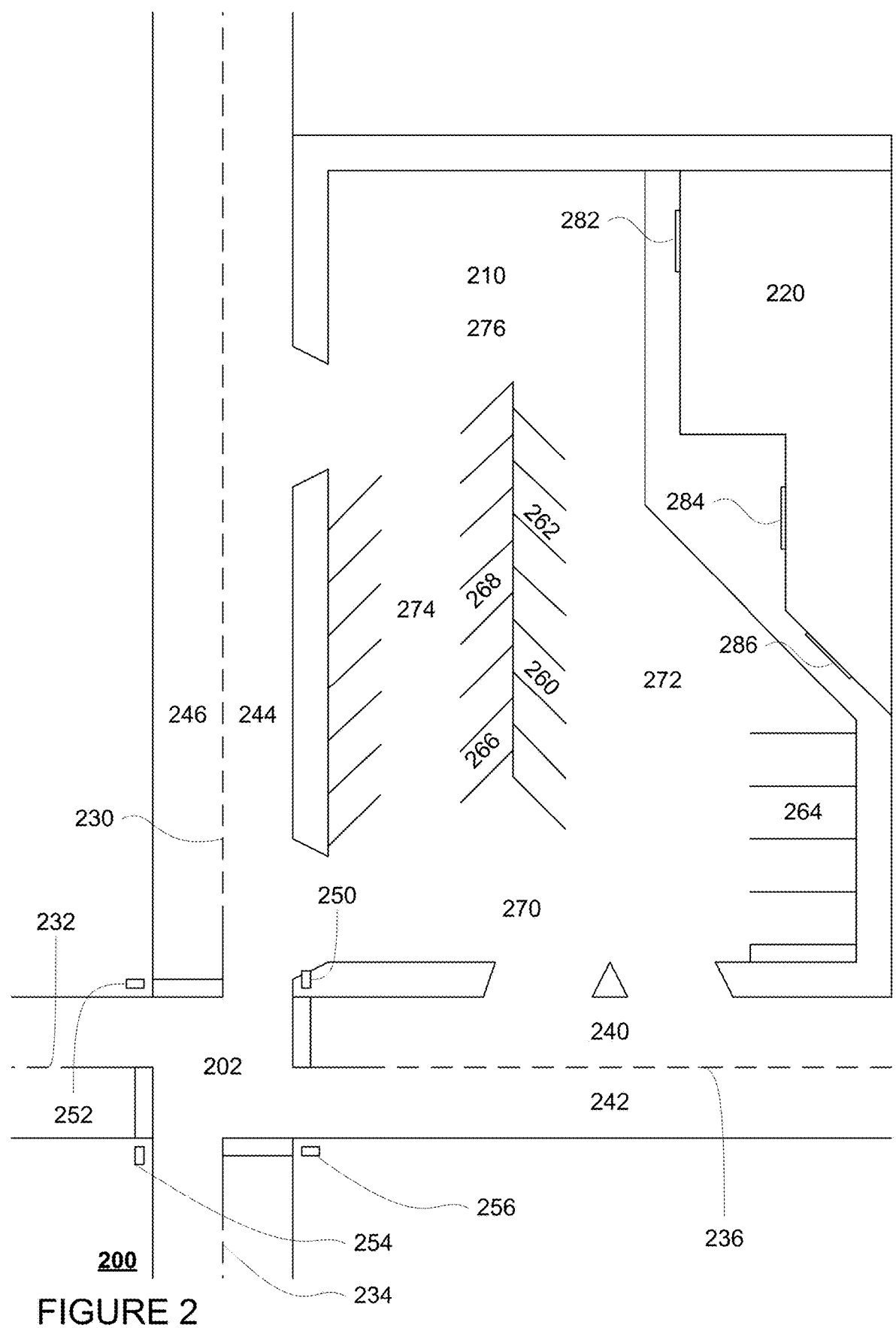
FIG. 2 is an example of map information in accordance with aspects of the disclosure.

FIG. 2 is an example of map information 200 for a section of roadway including intersection 202 which is adjacent to a parking lot 210 for a building 220. The map information 200 may be a local version of the map information stored in the memory 130 of the computing devices 110. Other versions of the map information may also be stored in the storage system 450 discussed further below. In this example, the map information 200 includes information identifying the shape, location, and other characteristics of lane lines 230, 232, 234, 236, lanes 240, 242, 244, 246, stop signs 250, 252, 254, 256, etc. In this example, the map information 200 also includes information identifying features of the parking lot 210 and building 220. For instance, as parking spaces 260, 262, 264, 266, 268, drivable areas 270, 272, 274, 276, etc. In addition, in this example, the map information identifies entrances and exits 282, 284, 286 of building 220. Although only few features are depicted in the map information 200 of FIG. 2, however, the map information 200 may include significantly more features and details in order to enable the vehicle 100 to be controlled in the autonomous driving mode.

Although the map information is depicted herein as an image-based map, the map information need not be entirely image based (for example, raster). For example, the map information may include one or more roadgraphs or graph networks of information such as roads, lanes, intersections, and the connections between these features which may be represented by road segments. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

Positioning system 170 may be used by autonomous control system 176 in order to determine the vehicle's relative or absolute position on a map or on the earth. For example, the position system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The positioning system 170 may also include other devices in communication with the computing devices autonomous control system 176, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

Figure 3:
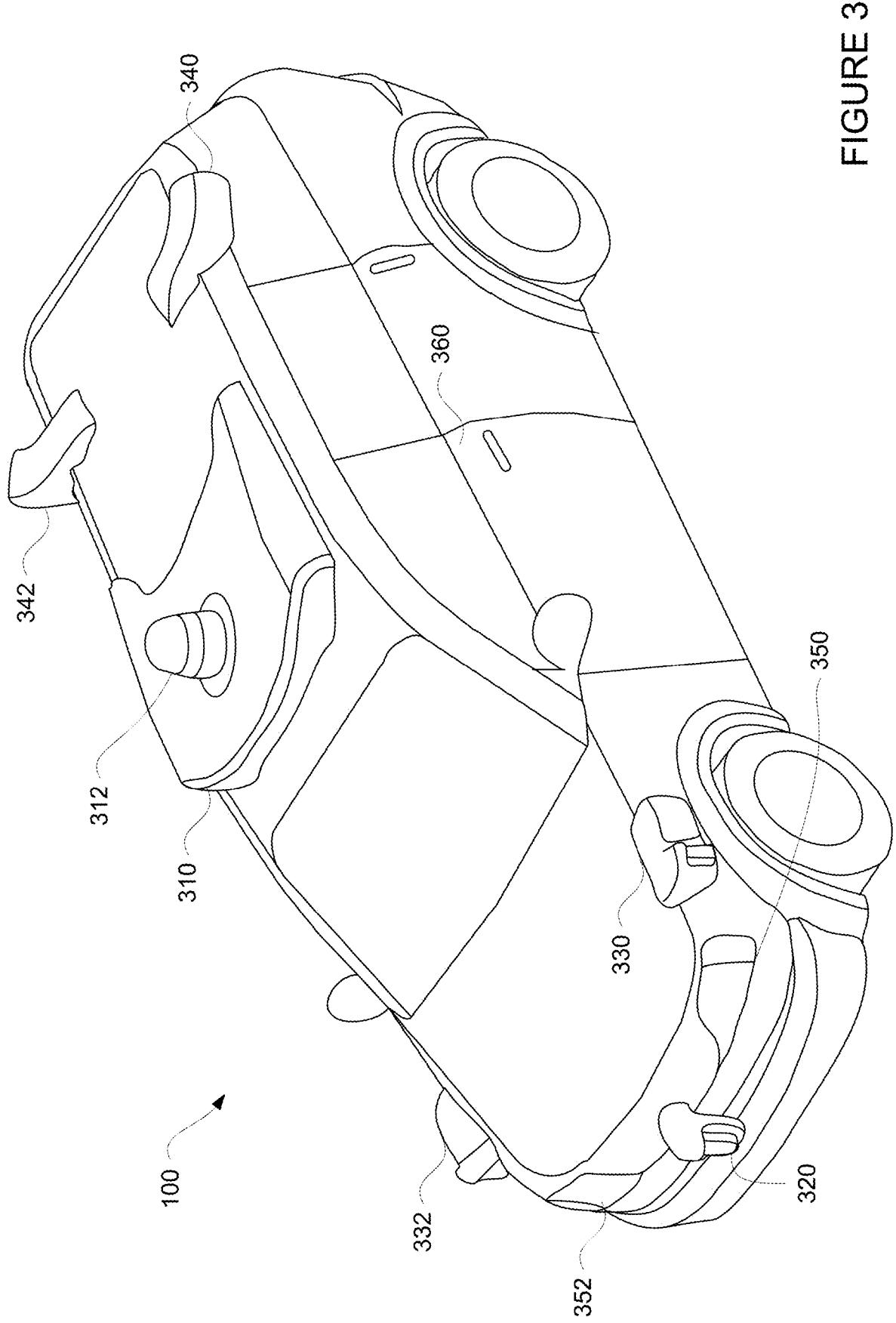
FIG. 3 is an example external view of a vehicle in accordance with aspects of the disclosure.

The perception system 172 also includes one or more components for detecting objects external to the vehicle such as other vehicles, obstacles in the roadway, traffic signals, signs, trees, etc. For example, the perception system 172 may include lasers, sonar, radar, cameras and/or any other detection devices that record data which may be processed by the computing devices of the autonomous control system 176. In the case where the vehicle is a passenger vehicle such as a minivan, the minivan may include a laser or other sensors mounted on the roof or other convenient location. For instance, FIG. 3 is an example external view of vehicle 100. In this example, roof-top housing 310 and dome housing 312 may include a LIDAR sensor as well as various cameras and radar units. In addition, housing 320 located at the front end of vehicle 100 and housings 330, 332 on the driver's and passenger's sides of the vehicle may each store a LIDAR sensor. For example, housing 330 is located in front of driver door 360. Vehicle 100 also includes housings 340, 342 for radar units and/or cameras also located on the roof of vehicle 100. Additional radar units and cameras (not shown) may be located at the front and rear ends of vehicle 100 and/or on other positions along the roof or roof-top housing 310.

The autonomous control system 176 may capable of communicating with various components of the vehicle in order to control the movement of vehicle 100 according to primary vehicle control code of memory of the autonomous control system 176. For example, returning to FIG. 1, the autonomous control system 176 may include various computing devices in communication with various systems of vehicle 100, such as deceleration system 160, acceleration system 162, steering system 164, routing system 166, planner system 168, positioning system 170, perception system 172, and power system 174 (i.e. the vehicle's engine or motor) in order to control the movement, speed, etc. of vehicle 100 in accordance with the instructions 134 of memory 130.

The various systems of the vehicle may function using autonomous vehicle control software in order to determine how to and to control the vehicle. As an example, a perception system software module of the perception system 172 may use sensor data generated by one or more sensors of an autonomous vehicle, such as cameras, LIDAR sensors, radar units, sonar units, etc., to detect and identify objects and their characteristics. These characteristics may include location, type, heading, orientation, speed, acceleration, change in acceleration, size, shape, etc. In some instances, characteristics may be input into a behavior prediction system software module which uses various behavior models based on object type to output a predicted future behavior for a detected object. In other instances, the characteristics may be put into one or more detection system software modules, such as a traffic light detection system software module configured to detect the states of known traffic signals, construction zone detection system software module configured to detect construction zones from sensor data generated by the one or more sensors of the vehicle as well as an emergency vehicle detection system configured to detect emergency vehicles from sensor data generated by sensors of the vehicle. Each of these detection system software modules may uses various models to output a likelihood of a construction zone or an object being an emergency vehicle. Detected objects, predicted future behaviors, various likelihoods from detection system software modules, the map information identifying the vehicle's environment, position information from the positioning system 170 identifying the location and orientation of the vehicle, a destination for the vehicle as well as feedback from various other systems of the vehicle may be input into a planner system software module of the planner system 168. The planner system may use this input to generate trajectories for the vehicle to follow for some brief period of time into the future based on a route generated by a routing module of the routing system 166. A control system software module of the autonomous control system 176 may be configured to control movement of the vehicle, for instance by controlling braking, acceleration and steering of the vehicle, in order to follow a trajectory.

The autonomous control system 176 may control the vehicle in an autonomous driving mode by controlling various components. For instance, by way of example, the autonomous control system 176 may navigate the vehicle to a destination location completely autonomously using data from the detailed map information and planner system 168. The autonomous control system 176 may use the positioning system 170 to determine the vehicle's location and perception system 172 to detect and respond to objects when needed to reach the location safely. Again, in order to do so, computing device 110 may generate trajectories and cause the vehicle to follow these trajectories, for instance, by causing the vehicle to accelerate (e.g., by supplying fuel or other energy to the engine or power system 174 by acceleration system 162), decelerate (e.g., by decreasing the fuel supplied to the engine or power system 174, changing gears, and/or by applying brakes by deceleration system 160), change direction (e.g., by turning the front or rear wheels of vehicle 100 by steering system 164), and signal such changes (e.g., by lighting turn signals). Thus, the acceleration system 162 and deceleration system 160 may be a part of a drivetrain that includes various components between an engine of the vehicle and the wheels of the vehicle. Again, by controlling these systems, autonomous control system 176 may also control the drivetrain of the vehicle in order to maneuver the vehicle autonomously.

Figure 4:
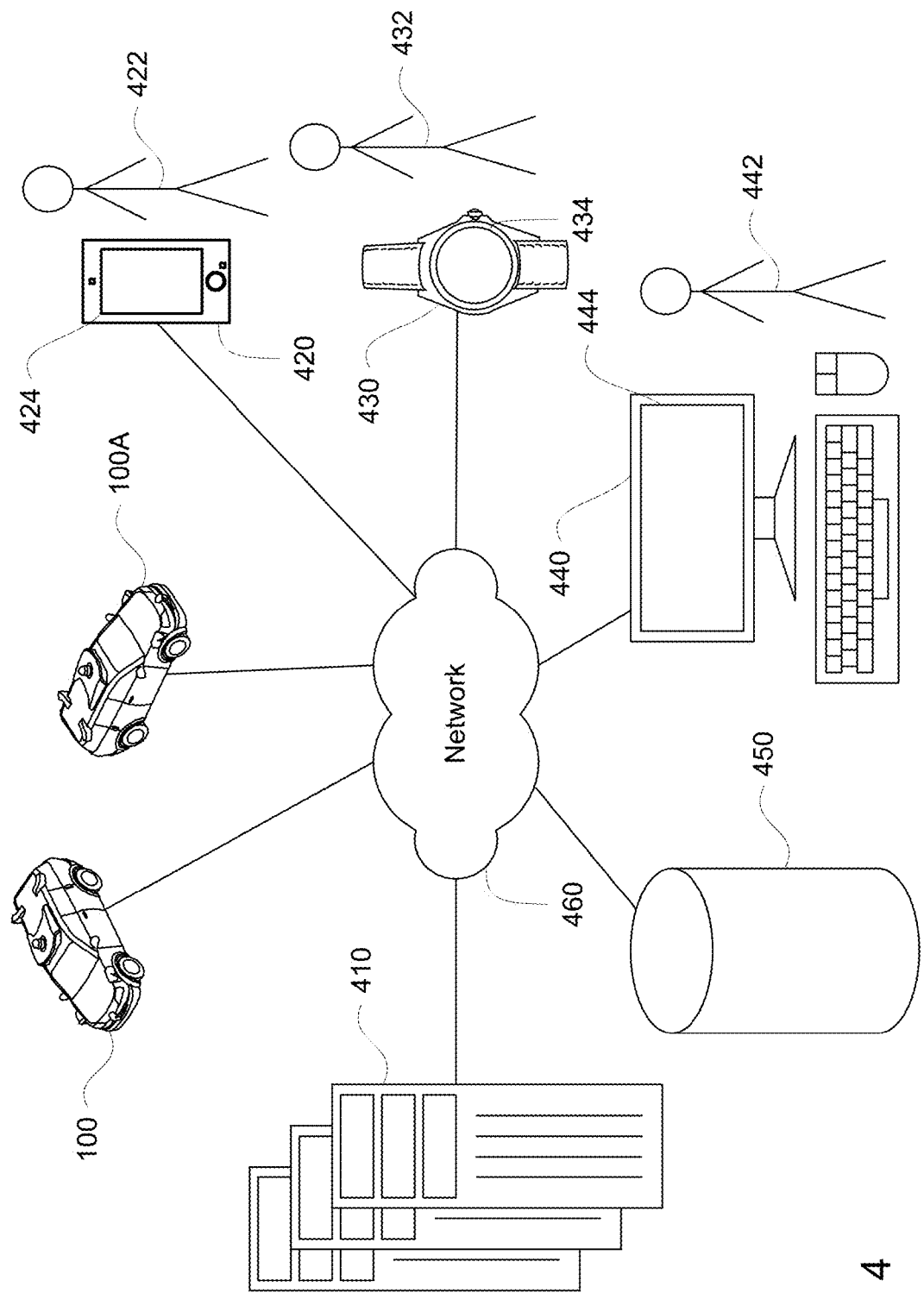
FIG. 4 is a pictorial diagram of an example system in accordance with aspects of the disclosure.
Figure 5:
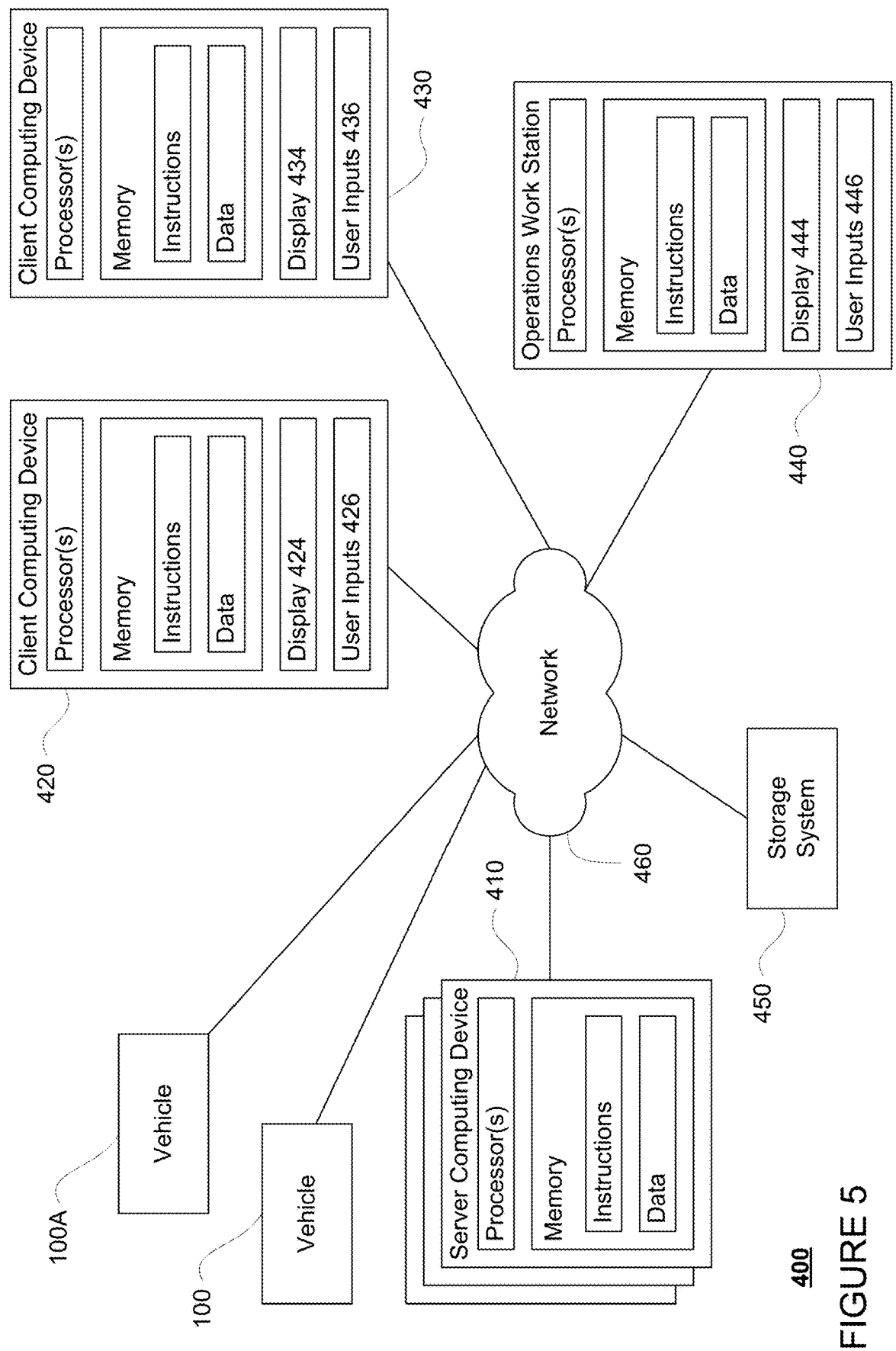
FIG. 5 is a functional diagram of the system of FIG. 4 in accordance with aspects of the disclosure.

Computing device 110 of vehicle 100 may also receive or transfer information to and from other computing devices, such as those computing devices that are a part of the transportation service as well as other computing devices. FIGS. 4 and 5 are pictorial and functional diagrams, respectively, of an example system 400 that includes a plurality of computing devices 410, 420, 430, 440 and a storage system 450 connected via a network 460. System 400 also includes vehicle 100, and vehicles 100A, 100B which may be configured the same as or similarly to vehicle 100. Although only a few vehicles and computing devices are depicted for simplicity, a typical system may include significantly more.

As shown in FIG. 5, each of computing devices 410, 420, 430, 440 may include one or more processors, memory, data and instructions. Such processors, memories, data and instructions may be configured similarly to one or more processors 120, memory 130, data 132, and instructions 134 of computing device 110.

The network 460, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 410 may include one or more server computing devices having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with computing device 110 of vehicle 100 or a similar computing device of vehicle 100A as well as computing devices 420, 430, 440 via the network 460. For example, vehicles 100, 100A, may be a part of a fleet of vehicles that can be dispatched by server computing devices to various locations. In this regard, the server computing devices 410 may function as a dispatching server computing system which can be used to dispatch vehicles such as vehicle 100 and vehicle 100A to different locations in order to pick up and drop off passengers. In addition, server computing devices 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 5, each client computing device 420, 430, 440 may be a personal computing device intended for use by a user 422, 432, 442, and have all of the components normally used in connection with a personal computing device including a one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices 426, 436, 446 (e.g., a mouse, keyboard, touchscreen or microphone). The client computing devices may also include a camera for recording video streams, speakers, a network interface device, and all of the components used for connecting these elements to one another.

Although the client computing devices 420, 430, and 440 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, shown as a wristwatch as shown in FIG. 4. As an example the user may input information using a small keyboard, a keypad, microphone, using visual signals with a camera, or a touch screen.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIGS. 4 and 5, and/or may be directly connected to or incorporated into any of the computing devices 110, 410, 420, 430, 440, etc.

Storage system 450 may store various types of information. For instance, the storage system 450 may also store the aforementioned autonomous vehicle control software which is to be used by vehicles, such as vehicle 100, to operate a vehicle in an autonomous driving mode. This autonomous vehicle control software stored in the storage system 450 include various invalidated and validated versions of the autonomous vehicle control software. Once validated, the autonomous vehicle control software may be sent, for instance, to memory 130 of vehicle 100 in order to be used by computing devices of the vehicle in order to control the vehicle in an autonomous driving mode.

Storage system 450 may store various types of information as described in more detail below. This information may be retrieved or otherwise accessed by a server computing device, such as one or more server computing devices 410, in order to perform some or all of the features described herein. For instance, the storage system may store various models as well as parameter values for the models which can be updated via training as discussed further below. The storage system 450 may also store log data. This log data may include, for instance, sensor data generated by a perception system, such as the perception system 172 of vehicle 100. The perception system may include a plurality of sensors that generate sensor data. As an example, the sensor data may include raw sensor data as well as data identifying defining characteristics of perceived objects (including other road users) such as shape, location, orientation, speed, etc. of objects such as vehicles, pedestrians, bicyclists, vegetation, curbs, lane lines, sidewalks, crosswalks, buildings, etc. The log data may also include "event" data identifying different types of audible communications generated by the vehicle in response to the vehicle's environment and/or a request to do so as discussed further below.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 6:
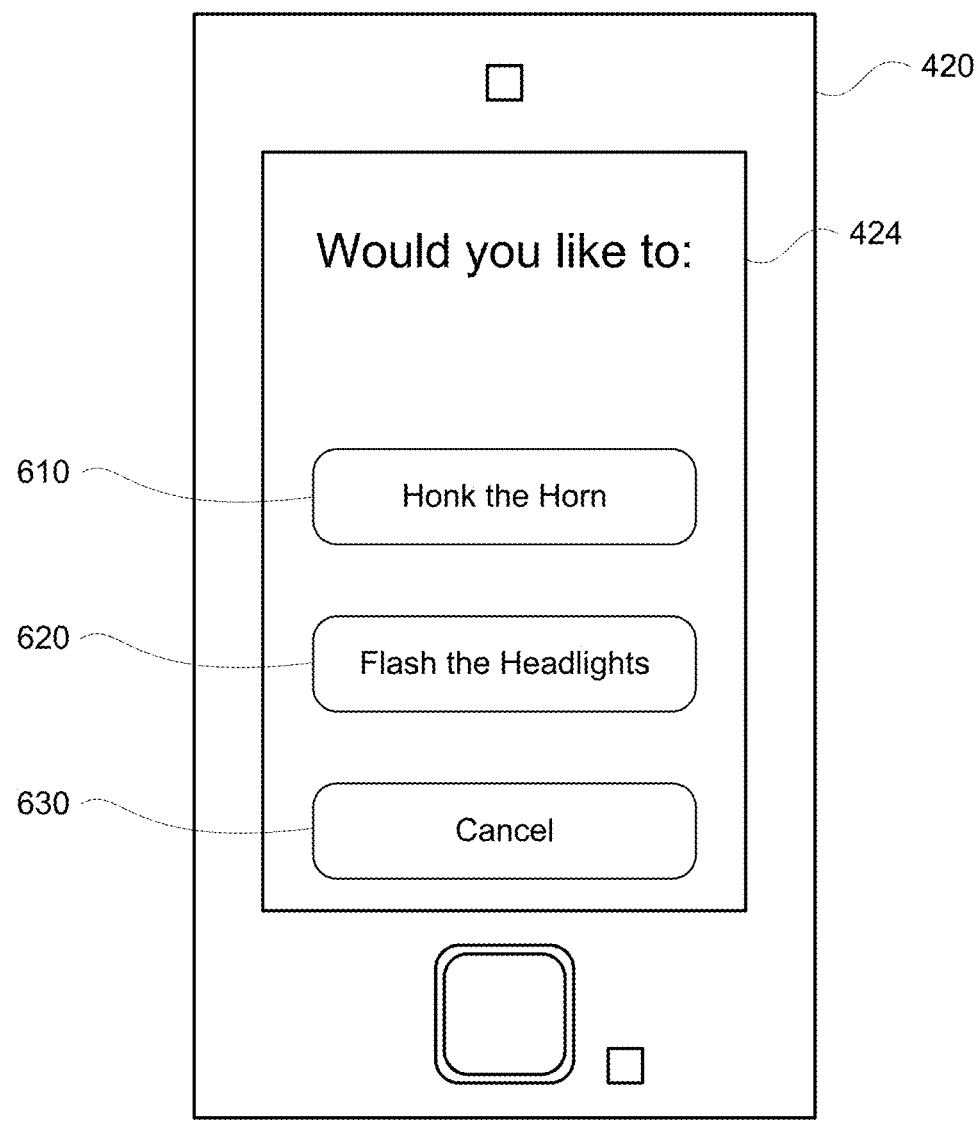
FIG. 6 is an example of a client computing device and displayed options in accordance with aspects of the disclosure.

In order to generate and train a model, users of the service may be provided with an option, for instance via an application on the user's computing device (i.e. mobile phone), to request that the vehicle provide a communication. In this regard, using the option may cause the vehicle to provide a communication. When the user uses the option, this data may be recorded. FIG. 6 is an example view of a client computing device 420, including options 610, 620 displayed on display 424. In this example, option 610 may allow the client computing device to send a request to the vehicle, for instance, via network 460 or other wireless connection, to cause the vehicle to generate an audible communication by honking the horn, or playing corresponding audio through the speakers 154. Option 620 may allow the client computing device to send a request to the vehicle, for instance, via network 460 or other wireless connection, to cause the vehicle to generate a visual communication, for example by flashing the headlights 350, 352 and/or by displaying information on the electronic display 152. In some example, option 630 may be provided to allow a user to not request any communication, such as where the user is confident he or she has identified his or her vehicle.

For instance, a user may use the option 620 in a dark parking lot to cause an autonomous vehicle to flash its headlights. As another instance, in a well-lit parking lot when there are few other pedestrians present, a user may use the option 610 to cause the vehicle to honk its horn or provide some other audible communication. In instances where there are more pedestrians present, a user may select option 620 over option 610. As another example, a user may use the option 610 to cause the vehicle to honk its horn when in a large parking lot or near a large building. As still another option, a user may use the option 620 to cause the vehicle to flash its head lights when there are a plurality of autonomous vehicles nearby. Alternatively, rather than flashing the headlights, another type of visual communication option, such as displaying information on the electronic display 152, may be provided.

Each time one of the options, such as options 610, 620, is used to request a communication, a message may be provided to the vehicle to cause the vehicle's computing devices 110 to make or generate the communication. This message may include information such as the date and time the request was generated, the type of the communication to be made, as well as a location of the user. This message as well as other message information may also be sent, for instance, by the vehicle and/or the user's client computing device to a server computing system, such as server computing system 410 which may store the messages in storage system 450. As an example, the other message information may include data generated by the vehicle's computing system such as the location of the vehicle, the type of communication (flashing lights, displaying information on the electronic display 152, honking, etc.), the locations and/or characteristics of other road users (vehicles, pedestrians, bicyclists, etc.) detected by the vehicle's perception system 172, ambient lighting conditions, etc.

As an example, ambient lighting conditions may be determined in any number of different ways. For instance, the computing devices 110 may receive feedback from the vehicle's light sensors, such as those used to control the state of a vehicle's headlights and adjust brightness of internal electronic displays, in some instances such as electronic display 152. If feedback from the light sensors is not directly available to the computing devices 110, this information may also be gleaned from the state of the vehicle's headlights and/or internal electronic displays. In other words, the computing devices 110 may be able to determine from this information whether it is "dark enough" for the vehicle to have its headlights on or the internal electronic displays at certain brightness. In addition or alternatively, the ambient lighting conditions may be determined from data generated by the vehicle's perception system. As indicated above, the perception system 172 may include a plurality of different sensors, some of which, such as still or video cameras, may be used to determine ambient lighting conditions. For instance, "live" camera images of the vehicle's environment may be analyzed to determine ambient lighting conditions. This may include processing pixels to determine whether the area toward which the camera is oriented towards is a bright area. If the pixels are bright, and the image has a short exposure time, this may indicate that the area is also bright. As another instance, the ambient lighting conditions may be determined in real time by using camera exposure values. As an example, when capturing images, the cameras of the perception system 172 may automatically recalibrate exposure values given the ambient lighting conditions. In this regard, the exposure values may be considered a proxy for how bright the area viewable by the vehicle's camera currently is. For instance, real time exposure values may be used to determine the ambient lighting conditions. The longer the exposure value, the darker the scene or rather, the lower the ambient lighting conditions. Similarly, the shorter the exposure value, the brighter the scene or rather, the higher the ambient lighting conditions. In addition, exposure values for time periods when the sun is not out (i.e. dusk till dawn on any given day of the year) may be reviewed to identify those with small exposure times which would indicate brighter artificial lighting.

The messages and other message information, including the sensor data, may then be processed by the server computing devices 410 in order to generate and train the model. The model may be a machine learned model such as a decision tree (such as a random forest decision tree), deep neural network, logistic regression, neural network, etc. To train the model, the location of the user, the other message information (including sensor data generated by perception systems 172 of the various vehicles that generated the messages), as well as map information may be used as training inputs and the type of communication (from the messages) may be used as training outputs.

The training may thus include receiving the training data including various training inputs as well as a training output or target output. The model may be trained on the training data using current values of parameters of the model to generate a set of output values. These output values may indicate of a level of appropriateness for a type of communication or whatever other output data to be determined using the model. The target output and the set of output values may be compared to one another to determine a difference value or values indicating how far off from one another these values are. Based on this difference value or values, the current values of parameters of the model may be adjusted. Repeated training and adjusting may increase the precision of the model. Thus, the more training data used to train the model, the more precise the model will be at determining whether and what type of communication to provide automatically or what type of communication option to provide or enable as discussed further below. In addition, by using the map information as training data, the model may be trained to incorporate how the environment, for instance the type of road or area (e.g. residential or commercial) in which the vehicle and/or the pedestrian are located, affects a user's desire for a communication into the determination of which type of communication or communication option to provide or enable.

In addition, by using the date and time and/or ambient lighting conditions as training data, the model may be trained to differentiate between different times of day and lighting conditions for different types of communications output by the model. For instance, the date and time as well as ambient lighting conditions may also be used as training inputs. Again, the more training data used to train the model, the more precise the model may become at determining when and what type of communication to enable and/or provide.

In addition, via feedback and hand training, weights may be assigned (or generated) for the different communication options in order to decrease the likelihood for false positives, or rather indicating that a vehicle should generate a communication at an inappropriate or inopportune time. Such weights are likely to be heavily based on the environmental factors (such as map information and sensor data), and thus, such inputs, may cause the model to influenced by the corresponding weighted factors. For instance, when training the model, the model may be made heavily weighted against honking the horn with a pedestrian is within a short distance, such as 1-2 meters from the vehicle, as that can be jarring to the pedestrian.

Similarly, the model may be trained to differentiate between situations in which a visual communication is appropriate versus when an audible communication is appropriate. For instance, it may be less (or more) appropriate to honk the horn (or play a corresponding audible communication through speakers 154) in a crowded area, and it may be less (or more) appropriate to use the lights during the day time. In this regard, user feedback on the effectiveness or usefulness of different communications may also be used to train the model. As an example, a user may provide feedback indicating whether a particular communication was inappropriate or inconvenient and why (e.g. whether a person was standing in front of the vehicle when the headlights were flashed, which can be painful for that person's eyes, whether a honk or information displayed on the electronic display was disruptive to other persons in the vehicle's environment, etc.). In addition, audible communications may be more or less appropriate based on laws and regulations (e.g. it may be unlawful to flash the headlights or honk the horn in certain areas). Such examples of inappropriate, ineffective, inconvenient, or less useful communications may be generated and/or labeled (for instance, manually by human operators) as being inappropriate and used as training data. As such, as noted above, the model may be trained to output whether a communication is appropriate, and if so, a type of communication, or rather, whether the communication should be an audible one or a visual one. As one example, the model may identify a list of possible communication types and a corresponding level of appropriateness for each. In some instances, the users may provide positive and/or negative feedback about their experiences. This information could also be used to help train the model to select communications that users found most helpful as being more appropriate.

In some instances, depending upon the amount of training data available, the model may be trained for specific purposes. For instance, a model may be trained for a particular user or type of user based on that user's or type of user's history of being picked up at a particular location. In this way, the model may allow the vehicle to proactively provide notifications for a user in situations in which the vehicle is required to deviate from typical pickup locations for that user. For instance, if a user is typically picked up at one corner of a building, but there is an obstruction (such as construction, parked vehicles, debris a fallen tree, etc.), and a vehicle is forced to go to a different location, such as a different corner of the building, the model may be trained to the model may be trained to allow the vehicle to proactively notify the user via a visual and/or audible communication (such as a honk, flashing lights, or by displaying information on the electronic display 152) to get the user's attention as he or she exits the building. In this way, the vehicle is able to respond as needed. In some instances, the model may be trained to further notify the user via the application on the user's client computing device in conjunction with the visual and/or audible communication.

The trained model, or rather the model and the parameter values, may then be provided to one or more vehicles, such as vehicles 100, 100A, in order to allow the computing devices 110 of those vehicles to better communicate with people. As a vehicle is approaching or waiting at a pickup location (or drop off of goods). The vehicle's computing devices 110 may use the model to determine whether a communication is appropriate and if so, what type. This may occur, for instance, based on the vehicle's environment and/or depending on whether the user (or possible passenger) has a clear line of sight to the vehicle or vice versa.

In one aspect, the model and the parameter values may be used to determine whether an option as discussed above should be surfaced in the application. For instance, sensor data generated by the vehicle's perception system, local map information in an area around the vehicle, as well as the current location of the vehicle may be input into the model. The map information may include various relevant information, such as for instance, distance to the nearest curb, staircase, entrance or exit and/or whether the vehicle is proximate to another object, such as a wall or tree, that may obstruct a user's view of the vehicle, etc. This determining may be performed, for instance, once the vehicle's computing devices have located a place for the vehicle to stop and wait for the user, is pulling into that place, and/or the vehicle is already stopped (i.e. already parked). The model may then output whether a communication is appropriate and a value indicative of a level of appropriateness for each type of communication.

In one instance, if the output of the model indicates that a visual communication is more appropriate than an audible communication, the surfaced option may only allow for visual communication. In other words, if the value indicative of the appropriateness of a visual communication is greater than the value indicative of an audible communication, the surfaced option may only allow for visual communication. For instance, turning to FIG. 7, option 620 to provide a visual communication is not available, but option 610 to provide an audible communication is available.

Figure 8:
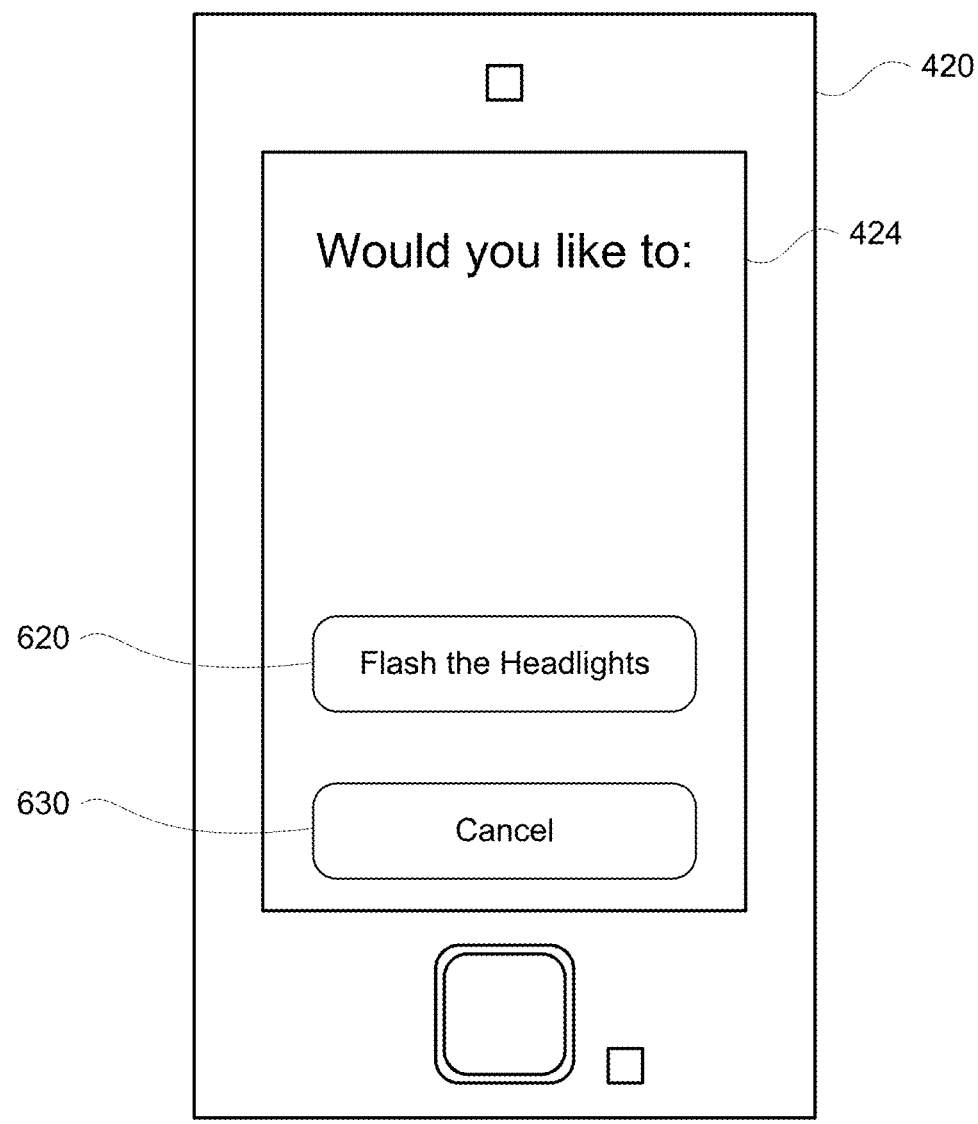
FIG. 8 is an example of a client computing device and displayed options in accordance with aspects of the disclosure.

Similarly, if the output of the model indicates that an audible communication is more appropriate than a visual communication, the surfaced option may only allow for visual communication. Again, in other words, if the value indicative of the appropriateness of an audible communication is greater than the value indicative of a visual communication, the surfaced option may only allow for visual communication. For instance, turning to FIG. 8, option 610 to provide an audible communication is not available, but option 620 to provide a visual communication is available.

Figure 9:
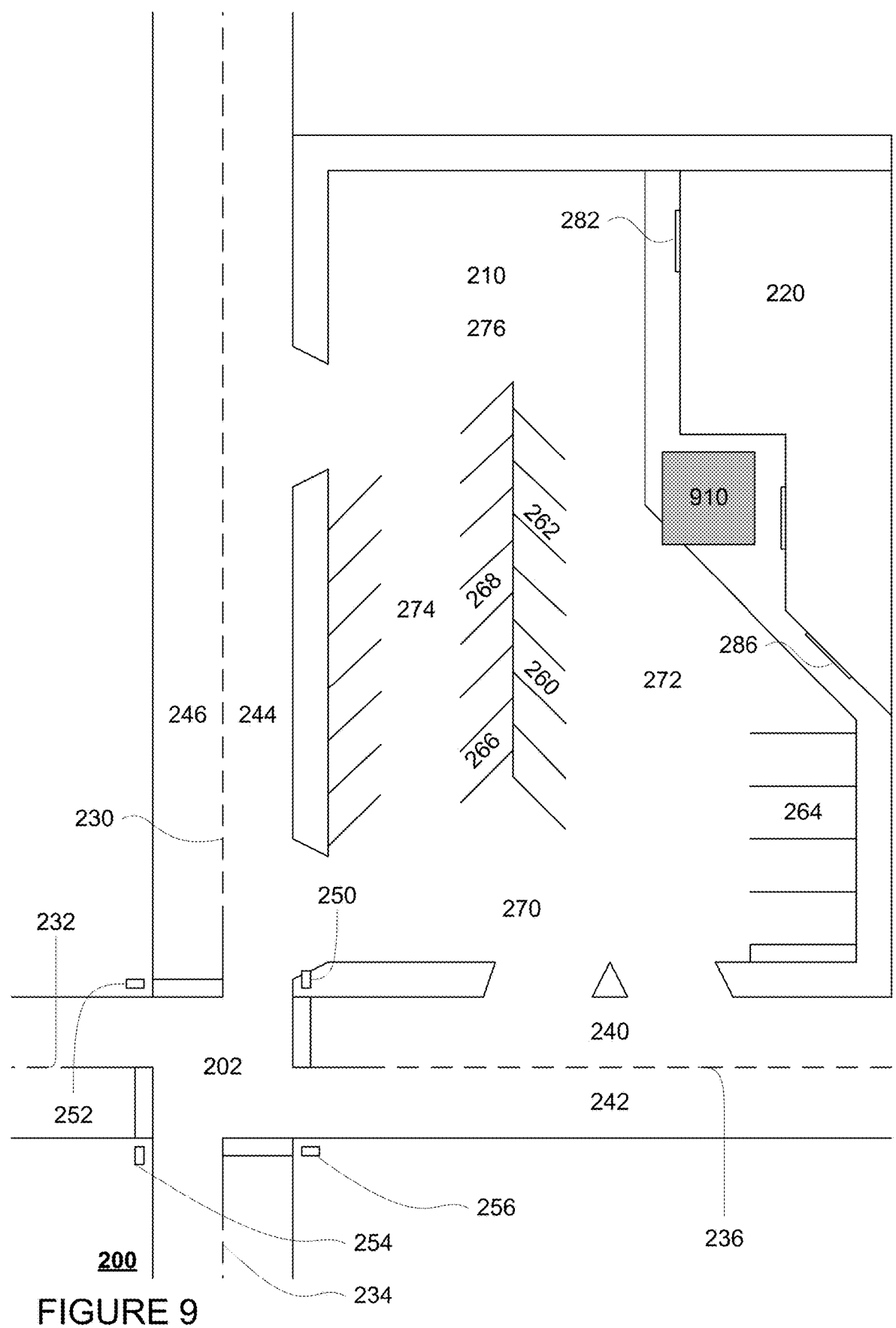
FIG. 9 is an example of map information in accordance with aspects of the disclosure.

As an example, turning to FIG. 9, corresponding to map information 200 of FIG. 2, the training data may indicate that when a user exits a building 220, for instance via entrance and exit 286, they tend to stand near area 910, and request an audible or visual communication, for instance, via options 610 or 620. Thus, when the trained model is used, when users exit building 220, for instance via entrance and exit 286, and are on trajectory towards or near area 910, as tracked by a GPS of their client computing device (and possibly confirmed by the detection of a pedestrian by the vehicle's perception system 172) the application may automatically surface an option to provide a communication (e.g. visual, audible, or both) as in any of the examples of FIGS. 6, 7, and 8.

Figure 10:
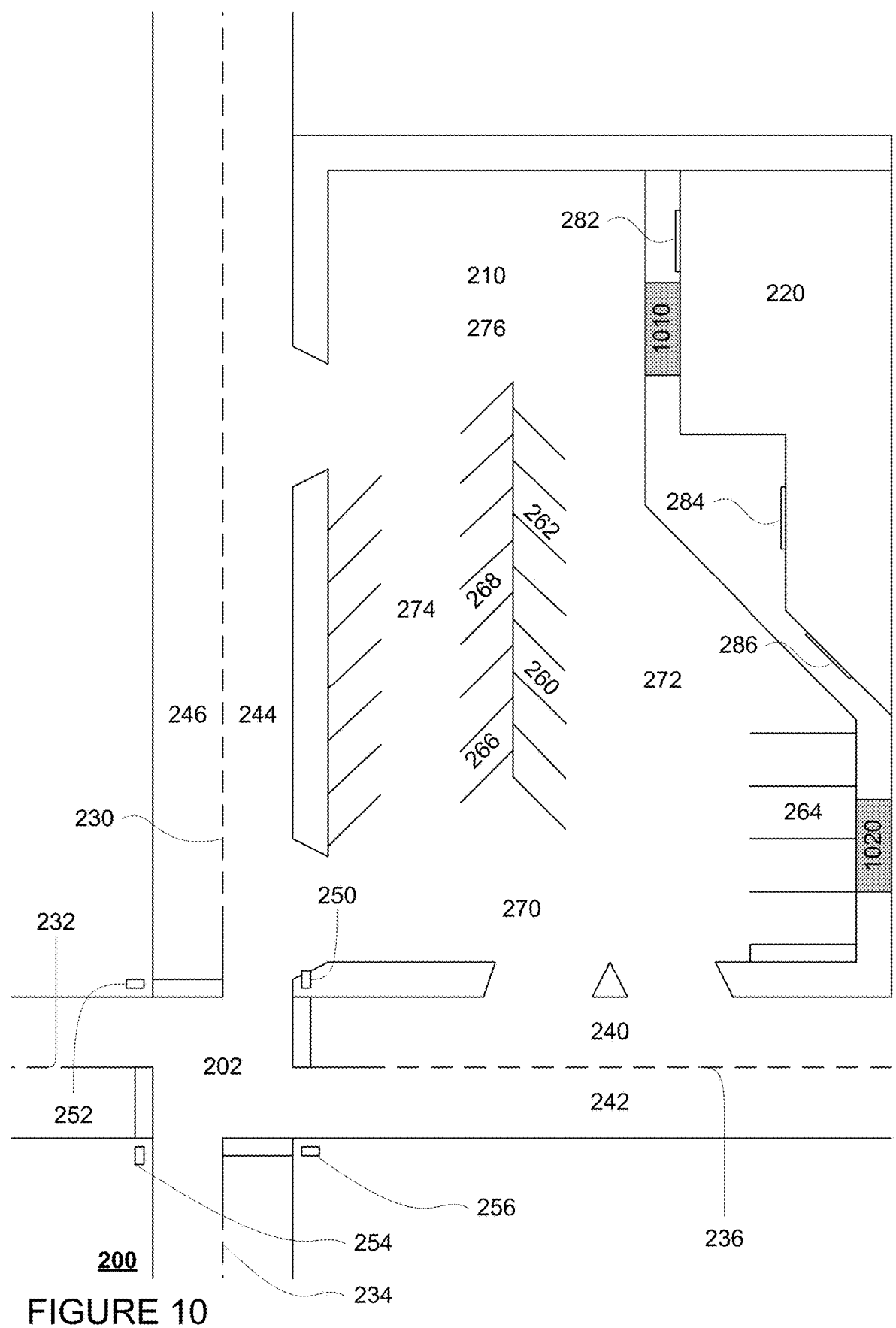
FIG. 10 is an example of map information in accordance with aspects of the disclosure.

In another aspect, the model may be used to determine whether the vehicle should automatically make the audible communication, as opposed to only surfacing an option as discussed above. Again, this determining may be performed, for instance, once the vehicle's computing devices have located a place for the vehicle to stop and wait for the user, is pulling into that place, and/or the vehicle is already stopped (i.e. already parked). For example, turning to FIG. 10, if the training data indicates that when a user exits building 220, for instance via entrance and exit 282, they tend stand near area 1010 and user option 610 to cause the vehicle's computing devices to honk the horn (or generate a corresponding audible communication via speakers 154). Thus, when the trained model is used, when users exit building 220 and are on trajectory towards or near area 1010, as tracked by a GPS of their client computing device (and possibly confirmed by the detection of a pedestrian by the vehicle's perception system) the computing devices 110 of the vehicle may automatically honk the horn (or generate a corresponding audible communication via speakers 154). For another instance, the training data may indicate that when a user exits building 220, for instance via entrance and exit 286, the user tends to stand near area 1020, and use option 620 to cause the vehicle's computing devices flash the headlights 350, 352. Thus, when the trained model is used, when there are many pedestrians around when users exits building 220 via entrance and exit 286 and the users are on trajectory towards or near area 1020 where there are many pedestrians around, as tracked by a GPS of their client computing device (and possibly confirmed by the detection of a pedestrian by the vehicle's perception system) the computing devices 110 of the vehicle may automatically flash the headlights 350, 352.

In some instances, the vehicle's computing devices may use information from a user's account information and/or other input from the user to determine the type of communication that is appropriate. For instance, if the user's account information or other input indicates that he or she has an impairment (visual or hearing-related) this may be used by the computing devices to "override" the output of the model and/or as an input to the mode. For example, a vision-impaired person may benefit more from an audible communication. However, if there are lots of other people around, the system may favor giving instruction through the user's device rather than honking. Similarly, a hearing-impaired person may benefit more from a visual communication than an audible communication. There also may be a higher threshold for various parameters relating to the distance a user would need to cover to make their way to the vehicle. For example, the vehicle's computing devices should avoid instructing or encouraging a vision-impaired person to cross a street or other non-pedestrian friendly area (high traffic) to get to the vehicle.

Figure 7:
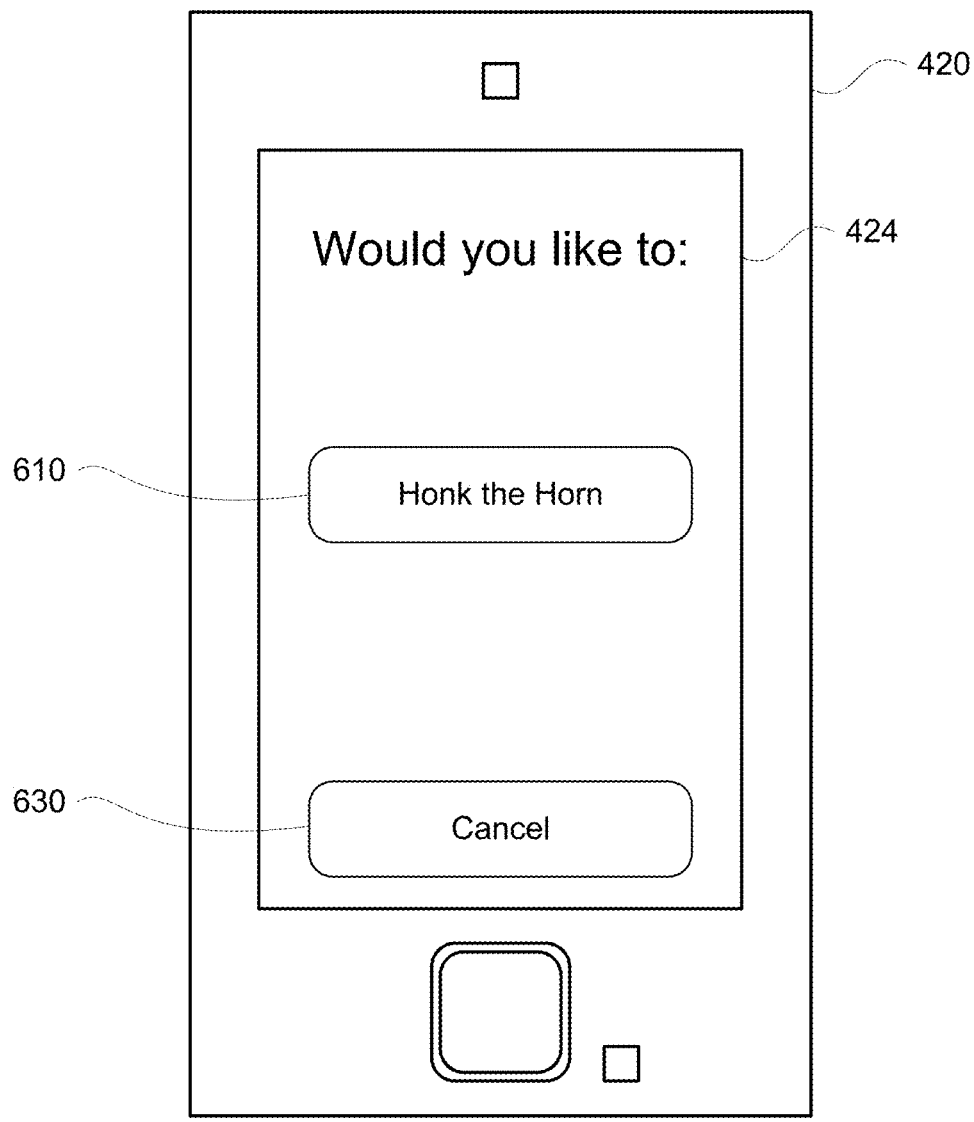
FIG. 7 is an example of a client computing device and displayed options in accordance with aspects of the disclosure.

In addition or alternatively, the output of the model may be used to determine and perform an initial action, and subsequent actions may be taken automatically depending upon the initial action. Again, this determining may be performed, for instance, once the vehicle's computing devices have located a place for the vehicle to stop and wait for the user, is pulling into that place, and/or the vehicle is already stopped (i.e. already parked). For instance, when a user exits building 220 and approaches area 1020, the computing devices 110 of the vehicle may automatically flash the headlights 350, 352. If there is no immediate change in trajectory of the user (e.g. towards the vehicle) and an option, such as option 610, may be surfaced via the user's client computing device to allow the user to cause the computing devices 110 of the vehicle to honk the vehicle's horn (or generate a corresponding audible communication via speakers 154), such as in the example of FIG. 7. As another instance, when a user exits building 220 and approaches area 1020, the computing devices 110 of the vehicle may automatically flash the headlights 350, 352. If there is no immediate change in trajectory of the user (e.g. towards the vehicle) and the computing devices 110 of the vehicle may automatically honk the vehicle's horn (or generate a corresponding audible communication via speakers 154). In some instances, in addition to automatically honking, an option, such as option 610, may also be surfaced to allow the user to cause the vehicle to honk the vehicle's horn (or generate a corresponding audible communication via speakers 154), as shown in the example of FIG. 7. Alternatively, rather than surfacing an option, a notification may be displayed to let the user know that the vehicle is honking the vehicle's horn. At least initially, these subsequent actions may be selected at random or by using human-tuned heuristics. In some instances, these heuristics may involve responding to specific audio queues or other information about the vehicle's environment (such as the other message information). For example, if there is a lot of ambient noise, a loud audio communication may be a useful initial action.

User responses to subsequent actions may be used to build a model of escalated communications. The model of escalated communications may be a machine learned model such as a decision tree (such as a random forest decision tree), deep neural network, logistic regression, neural network, etc. For instance, for each situation in which subsequent actions were used, the results may be tracked. This information may then be analyzed, for instance, by the server computing devices 410, in order to train the model of escalated communications and thereby identify patterns which increase the likelihood that the user will enter the vehicle more quickly in response to a vehicle communication. For instance, this analysis may include both "time to board"+"time/consistency of changing trajectory" in response to communications. As an example, if it takes N seconds to board for the typical (or average) user when they exit building 220. But if the vehicle's computing devices 110 provide an audible communication, there is a decrease to N/2 for example, such that there is a significant improvement in discover-ability of the vehicle. The same may also be true for change of trajectory. If a user is generally moving away from the vehicle at building 220, but eventually finds the vehicle in the average case, then ideally there may be a significant improvement in the time before the user corrects his or her trajectory towards the vehicle once the vehicle provides an audible communication.

The model of escalated communications may then be trained to determine based on a prior or initial action, what the next action should be to best facilitate the user reaching the vehicle. As one example, the model may be trained using the heading of the user. For instance, the training inputs to the model may include the actual time for a user to reach the vehicle and/or board the vehicle. what actions were utilized by the user over time, and the original heading of the user. These combined may indicate whether any escalated communication, for instance, the second or third communications initiated by the user, caused the time to board to decrease by correcting the heading of the user when the user triggered an action. So if users exiting the building heading North (when the vehicle is in fact, in the opposite direction, here South), uses the aforementioned options to cause the vehicle to honk its horn, and then changes headings towards the vehicle, the model may be trained to such that when tracking a user who exits and is heading North, the model may cause the vehicle to honk its horn early. Similarly, if the initial action does not cause the user to change his or her heading, the model of escalated communications may be used to determine a second communication, third communication, and so on, if necessary, based on the reaction (e.g. chang in heading) of the user. Again, the more training data used to train the model, the mode precise the model will be at determining how to escalate from a prior action.

As an example, the model of escalated communications may be trained such that for users exiting building 220 and standing at area 1010, and the vehicle has initially flashed its lights with no response from the user, the vehicle should thereafter automatically honk the vehicle's horn (or generate a corresponding audible communication via speakers 154). If there is no immediate change in trajectory of the user (e.g. towards the vehicle), and the computing devices 110 of the vehicle may automatically call for a customer service representative, for instance, a customer service representative, such as user 442 using computing device 440. The representative may be able to communicate with and guide the user to the vehicle by using sensor data generated by and received from the vehicle's perception system 172, the vehicle's location generated by and received from the vehicle's positioning system 170, as well as the user's location generated by and received from the user's client computing devices.

As another example, the model of escalated communications may be trained such that for users exiting building 220 and standing at area 1020, and the vehicle should thereafter automatically honk the vehicle's horn three times while waiting after each time to see if there is a change in trajectory of the user. As another example, the model of escalated communications may be trained such that for users exiting Building E at night, rather than surfacing options, the computing devices 110 of the vehicle may always automatically call for a customer service representative.

As with the first model, the trained model of escalated communications may then be provided to one or more vehicles, such as vehicles 100, 100A, in order to allow the computing devices 110 of those vehicles to better communicate with people.

In addition to using the messages and other information to train a model, the data may be analyzed in order to better facilitate pickups and drop offs. For instance, if users are generally located at area 1010 for a pick up and typically use an option to activate the vehicle's horn when the vehicle is 1020, this can be used to cause the vehicle to stop closer to the location of area 1010.

Figure 11:
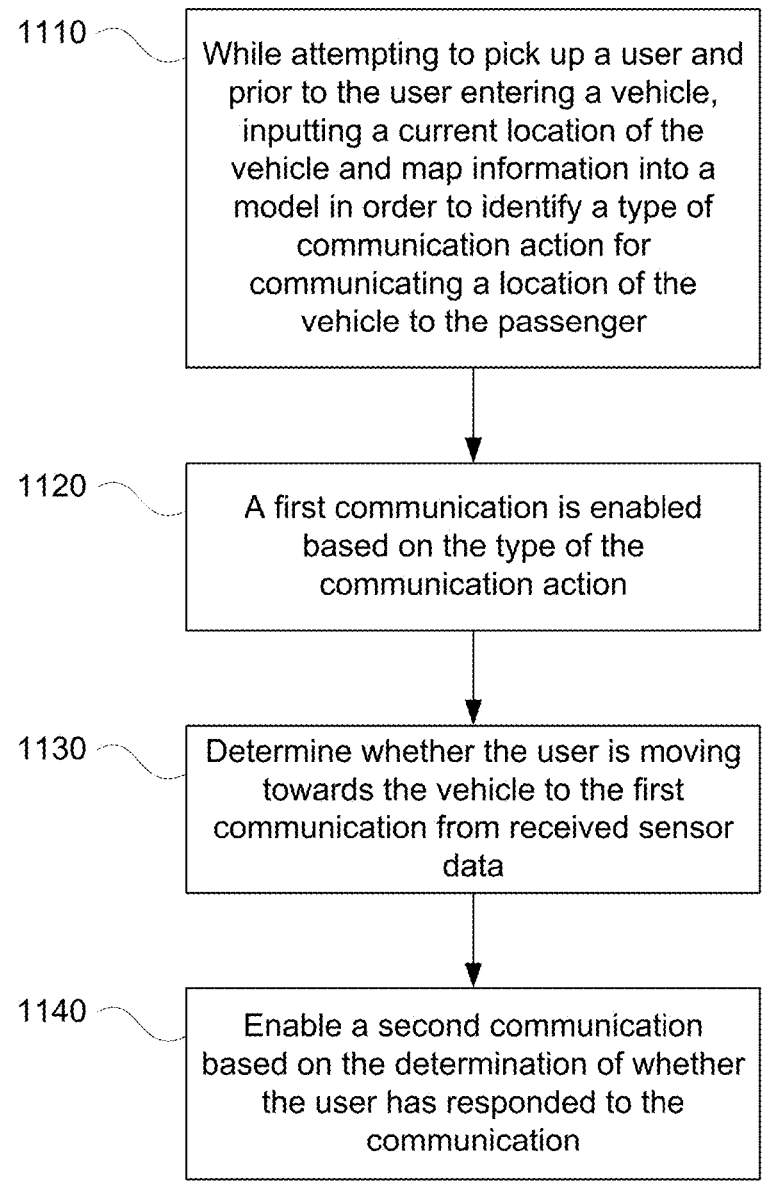
FIG. 11 is an example flow diagram in accordance with aspects of the disclosure.

FIG. 11 is an example flow diagram 1100 in accordance with aspects of the disclosure which may be performed by one or more processors of one or more computing devices, such as processors 120 of computing devices 110, in order to facilitating communications from an autonomous vehicle to a user.

As shown in block 1110, while attempting to pick up a user by a vehicle and prior to the user entering the vehicle, a current location of the vehicle and map information are input into a model in order to identify a type of communication action for communicating a location of the vehicle to the user. This may include the model and/or the model of escalated communications discussed above. As such, as noted above, the model may output whether a communication is appropriate, and if so, a type of communication, or rather, whether the communication should be an audible one or a visual one.

At block 1120, a first communication is enabled based on the type of the communication action. This enabling may include, for instance, surfacing an option as described above and/or automatically generating an audible or a visual communication as described above.

At block 1130, after enabling the first communication, whether the user is moving towards the vehicle is determined from received sensor data. In other words, whether the user has responded to the first communication may be determined. This sensor data may include sensor data generated by the vehicle's perception system 172 and/or sensor data from the user's client computing devices. From this sensor data, the vehicle's computing devices may determine, for example, whether the user is moving towards the vehicle, is oriented towards the vehicle, and/or if the user has changed headings in order to move towards the vehicle.

At block 1140, a second communication is enabled based on the determination of whether the user is moving towards the vehicle. As one example, the second communication may be enabled when the user is not moving towards the vehicle or has not changed his or her heading or orientation in order to be moving towards the vehicle in response to the enabling of the first communication. The enabling may include, for instance, surfacing an option as described above and/or automatically generating an audible or a visual communication as described above.

The features described herein may allow an autonomous vehicle to improve pickups and drop offs of passengers or users. For instance, users may on their own or by prompting use a surfaced option to cause a vehicle to communicate either visually and/or audibly with the user. This can more readily identify the location of the vehicle to user. In addition or alternatively, a vehicle may use the model to proactively determine whether and how to communicate with a user, as well as how to escalate those communications over time.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of training a model for facilitating communications from an autonomous vehicle to a user, the method including:
   receiving, by one or more computing devices, training data including a first training input that indicates a location of a vehicle, a second training input that indicates map information, a third training input that indicates a location of the user, a fourth training input that characterizes sensor data identifying one or more objects in the vehicle's environment, and a target output indicating a type of communication;
   training the model, by the one or more computing devices, on the training data according to current values of parameters of the model to generate a set of output values indicative of one or more types of communications;
   determining a difference value using the target output and the set of output values; and
   adjusting the current values of parameters of the model using the difference value.

2. The method of claim 1, wherein the training data corresponds to a request by the user to cause the vehicle to perform the type of communication in order to communicate with the user.

3. The method of claim 1, wherein the type of communication is an audible communication.

4. The method of claim 1, wherein the type of communication is a visual communication.

5. The method of claim 1, wherein the training data further includes ambient lighting conditions.

6. The method of claim 1, wherein the set of output values is further indicative of a level of appropriateness for a type of communication.

7. The method of claim 1, wherein the determining includes comparing the target output to the set of output values.

8. The method of claim 1, wherein the second training input is used to train the model to determine which one of a plurality of communication options should be provided or enabled, the plurality of communication options including at least one of flashing the vehicle's headlights, honking a horn of the vehicle, or displaying information on an electronic display of the vehicle.

9. The method of claim 1, further comprising receiving, by one or more computing devices, training data including ambient lighting conditions in order to train the model to differentiate between different ambient lighting conditions for different types of communications output by the model.

10. The method of claim 1, further comprising assigning weights for different communication options.

11. The method of claim 10, wherein the weights are assigned based on at least one of the map information or the sensor data.

12. The method of claim 1, wherein the model is trained to differentiate between situations in which a visual communication is appropriate versus when an audible communication is appropriate.

13. The method of claim 12, wherein training the model is further based on user feedback indicating whether a particular communication was inappropriate or inconvenient.

14. The method of claim 13, wherein the feedback further indicates a reason why the particular communication was inappropriate or inconvenient.

15. The method of claim 1, wherein training the model is further based on a user's history of being picked up at a particular location.

16. The method of claim 1, wherein the map information includes at least one of distance to a nearest curb, staircase, entrance or exit.

17. The method of claim 1, wherein the map information indicates whether the vehicle is proximate to another object that may obstruct a user's view of the vehicle.

18. An autonomous vehicle, comprising:
    a memory; and
    one or more computing devices operably coupled with the memory, the one or more computing devices configured to:
    receive training data including a first training input that indicates a location of a vehicle, a second training input that indicates map information, a third training input that indicates a location of a user, a fourth training input that characterizes sensor data identifying one or more objects in the vehicle's environment, and a target output indicating a type of communication;
    train the model, by the one or more computing devices, on the training data according to current values of parameters of the model to generate a set of output values indicative of one or more types of communications;
    determine a difference value using the target output and the set of output values; and
    adjust the current values of parameters of the model using the difference value.

19. The autonomous vehicle of claim 18, wherein the training data corresponds to a request by the user to cause the vehicle to perform the type of communication in order to communicate with the user, and
    wherein the type of communication is at least one of an audible communication or a visual communication.

20. The autonomous vehicle of claim 18, wherein the set of output values is further indicative of a level of appropriateness for a type of communication.

* * * * *

UNITED STATES PATENT AND TRADEMARK OFFICE
CERTIFICATE OF CORRECTION

| | |
|---|---|
| PATENT NO. | : 11,155,205 B2 |
| APPLICATION NO. | : 16/874928 |
| DATED | : October 26, 2021 |
| INVENTOR(S) | : Salil Pandit, Julien Mercay and Clement Wright |

It is certified that error appears in the above-identified patent and that said Letters Patent is hereby corrected as shown below:

In the Claims

Claim 18, Column 20, Line 49:
Now reads: "train the model"; should read -- train a model --

Signed and Sealed this
Seventeenth Day of October, 2023

Katherine Kelly Vidal
*Director of the United States Patent and Trademark Office*